Patented Feb. 8, 1927.

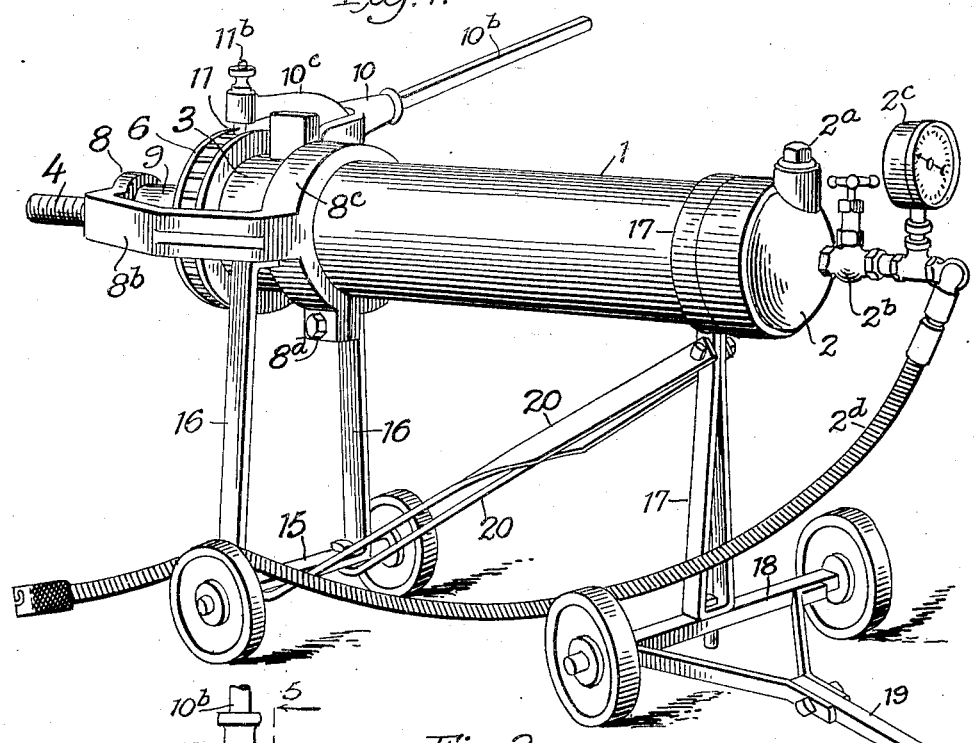
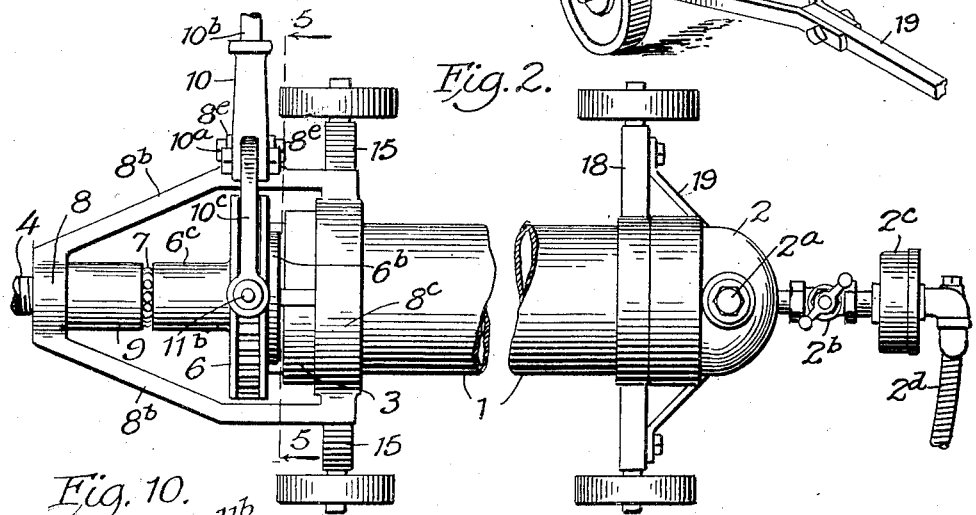
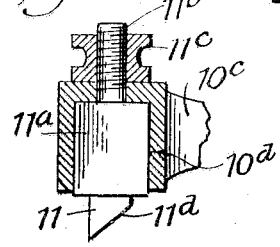

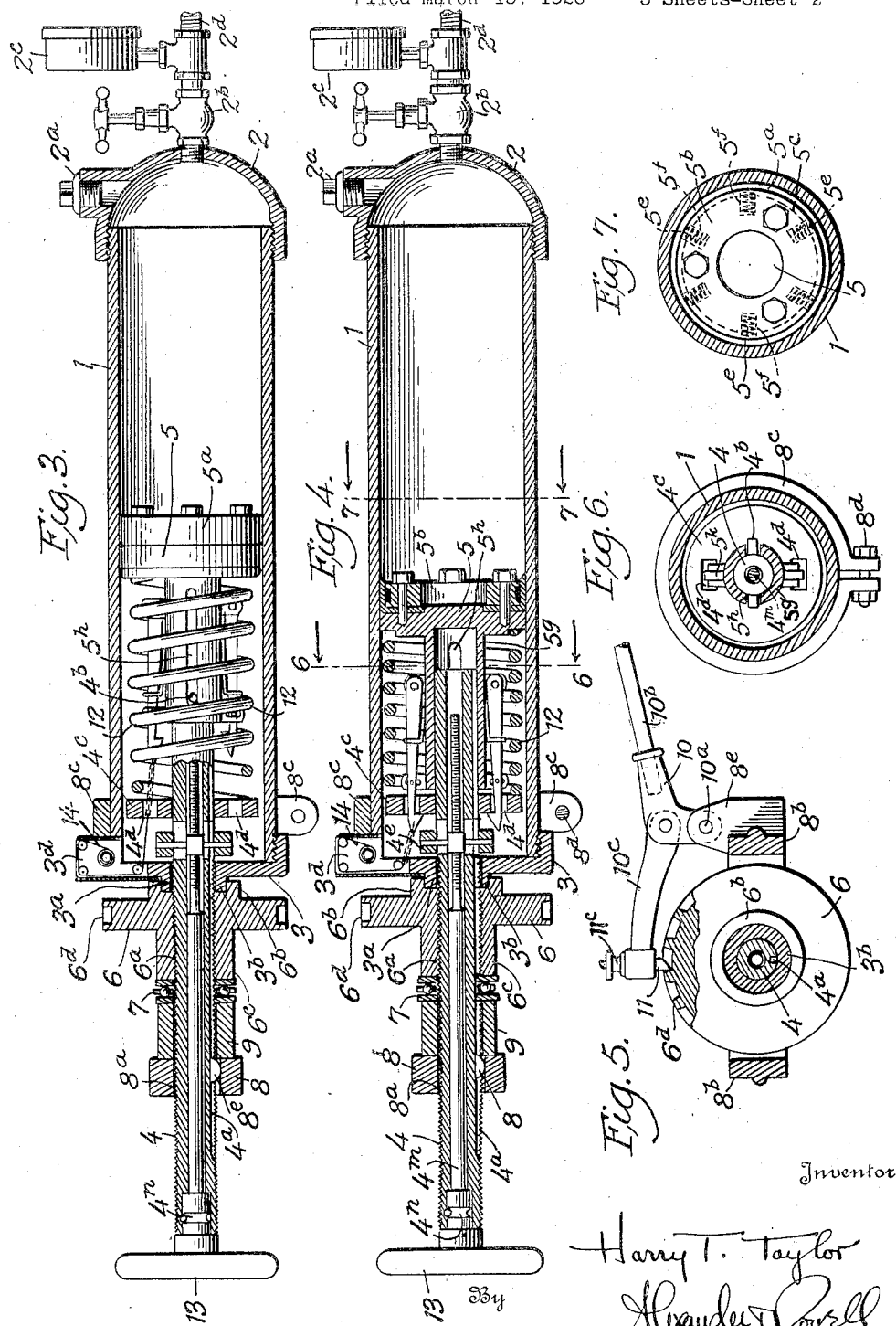

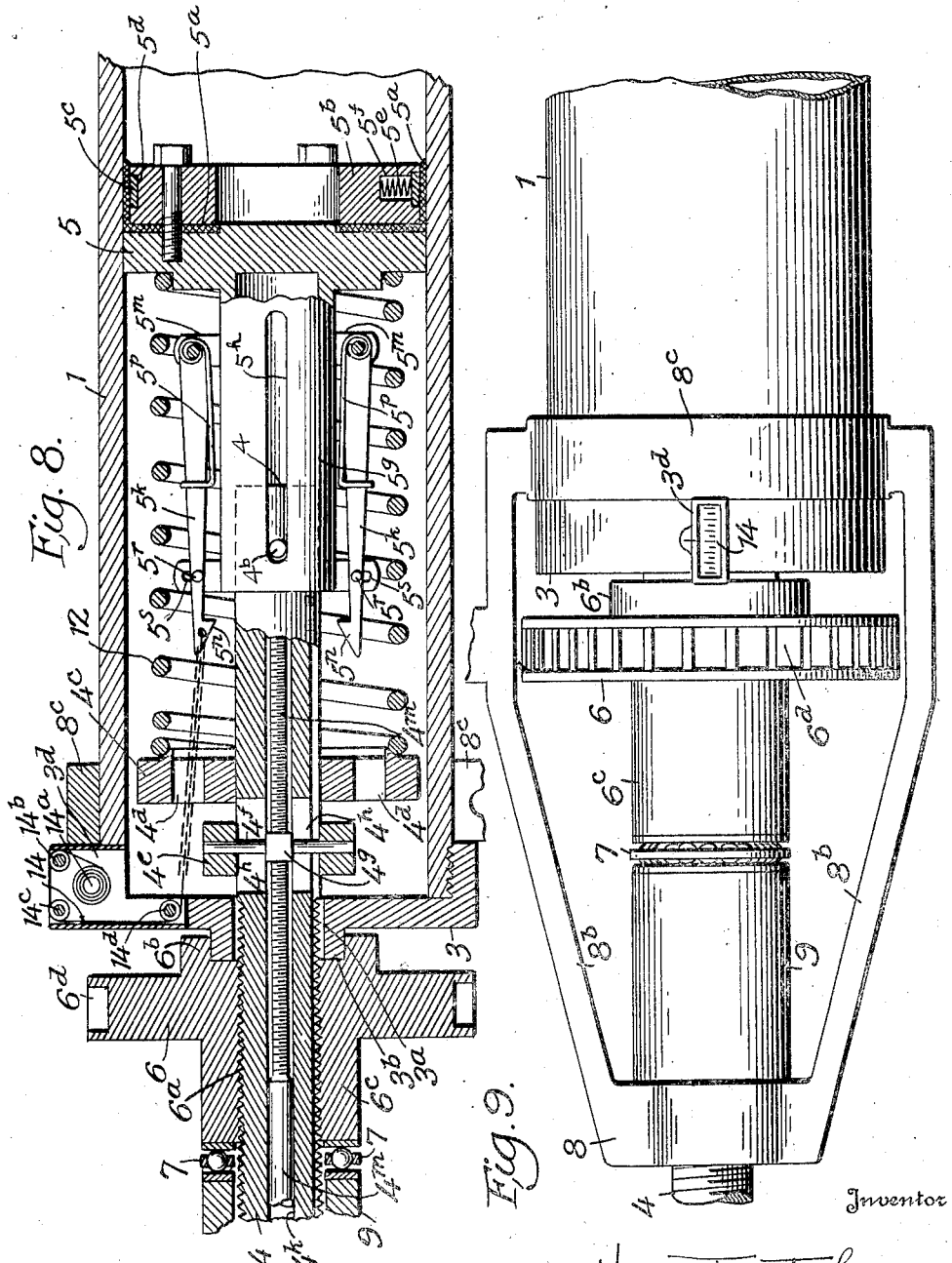

1,616,997

UNITED STATES PATENT OFFICE.

HARRY T. TAYLOR, OF MONROE, LOUISIANA, ASSIGNOR TO TAYLOR-JOHNSTON MANUFACTURING COMPANY, OF MONROE, LOUISIANA, A CORPORATION OF LOUISIANA.

GREASE GUN.

Application filed March 15, 1926. Serial No. 94,916.

This invention is a novel improvement in grease guns and the like, and the principal object thereof is to provide a simple, novel, and efficient portable grease gun embodying certain novel features of construction and arrangements of parts hereinafter set forth, said gun being capable of delivering lubricant under high pressure.

Another object of the invention is to provide a novel piston construction, and means for operating same, whereby when the gun has been filled with lubricant the lubricant can be readily given an initial pressure sufficient for immediate use without manipulating the piston rod.

Another object of the invention is to provide a resilient or yieldable connection between the piston and its piston rod, and means for automatically locking the piston to the end of the piston rod when the yielding means have been compressed its maximum extent, novel means being also provided for releasing said locking means.

A further object of the invention is to provide novel reversible ratchet means for advancing and retracting the piston on each "job".

Other minor objects of the invention will be hereinafter set forth.

I will explain the invention with reference to the accompanying drawings which illustrate one practical embodiment thereof to enable others to adopt and use the same, and will summarize in the claims the novel features of construction and novel combinations of parts for which protection is desired.

In said drawings:

Fig. 1 is a perspective view of my novel grease gun.

Fig. 2 is a plan view thereof (foreshortened).

Fig. 3 is a longitudinal section through the cylinder showing the piston and piston rod in "unlocked" relation.

Fig. 4 is a view similar to Fig. 3, but showing the piston and piston rod in "locked" relation.

Fig. 5 is a section on the line 5—5, Fig. 2.
Fig. 6 is a section on the line 6—6, Fig. 4.
Fig. 7 is a section on the line 7—7, Fig. 4.
Fig. 8 is an enlarged longitudinal section through the ratchet wheel end of the cylinder, and also showing in section the piston arrangement.

Fig. 9 is an enlarged plan view of the end of the cylinder shown in Fig. 8.

Fig. 10 is a detail section.

As shown, the grease gun preferably comprises a cylinder 1, of suitable length and diameter, having an outlet head 2 threaded thereon at one end, and a head 3 threaded thereon at the other end, through which head 3 the piston rod 4 extends, said piston rod being threaded for substantially its entire length as shown in Figs. 3 and 4, and adapted to actuate the piston 5 within the cylinder, which piston has a yielding telescopic connection with the end of rod 4, as hereinafter described.

Outlet head 2 is provided with a filling plug $2^a$ through which oil, grease, or other lubricant may be supplied to the cylinder 1. Also, a hand operated outlet valve $2^b$ is threaded into head 2, and connected to the outlet of valve $2^b$ is a pressure gauge $2^c$ adapted to register the pressure of the lubricant discharged from the grease gun, and connected to the outlet of the gauge $2^c$ is a pipe or hose $2^d$ carrying at its outer end a grease gun connector.

Head 3 is provided with a centrally disposed hole $3^a$ of diameter slightly larger than that of the piston rod 4, to permit rod 4 to readily pass therethrough, and surrounding hole $3^a$ is an exterior annular flange $3^b$ adapted to form a bearing for a ratchet wheel 6.

Ratchet wheel 6 is provided with a tapped bore $6^a$ adapted to receive the threaded piston rod 4, said wheel 6 being also provided with an axially disposed annular flange $6^b$ on its end adjacent the head 3, said flange $6^b$ being adapted to fit over flange $3^b$ of head 3 and center the ratchet wheel on head 3. At the other end of wheel 6 is an axial extension $6^c$ through which the tapped bore $6^a$ extends, the outer end of extension $6^c$ engaging a ball thrust bearing 7 loosely mounted on the piston rod 4.

The outer end of piston rod 4 is supported by a fixed bearing 8, having an axial bore $8^a$ of slightly larger diameter than that of rod 4 to permit the rod to pass therethrough, bearing 8 being supported by diametrically disposed arms $8^b$ extending from a split collar $8^c$ which is clamped around the cylinder 1 adjacent head 3, and tightened thereon by bolt $8^d$. Bearing 8 carries a key $8^e$ adapted to engage a longitudinally disposed keyway $4^a$ in the piston rod to prevent rotation of said rod, while permitting longitudinal movement thereof with respect to bearing 8 and head 3.

Interposed between the fixed bearing 8 and the ball thrust bearing 7, or rod 4, is a bearing collar 9 adapted to maintain the ratchet wheel 6 in proper position against the bearing flange $3^b$ of head 3, whereby as the ratchet wheel is rotated the piston rod 4 will be advanced into, or retracted from, the cylinder 1.

The means for rotating ratchet wheel 6 comprises an L-shaped member 10, pivoted as at $10^a$ between ears $8^c$ formed on one of the arms $8^b$ opposite the ratchet wheel 6. The other end of member 10 is connected with a handle bar $10^b$ whereby member 10 may be rocked on its pivot. Pivotally connected to the member 10 is an arm extending over the ratchet wheel, the outer end of which carries a pawl 11 adapted to contact with the teeth $6^d$ of wheel 6.

Preferably the outer end of arm $10^c$ is provided with a non-circular recess $10^d$ (Fig. 10) in its under side, into which the correspondingly shaped body portion $11^a$ of pawl 11 fits, and a threaded extension $11^b$ of part $11^a$ extends up through a perforation at the top of recess $10^d$. A nut $11^c$ maintains the pawl 11 in recess $10^d$. Preferably one face of pawl 11 is substantially parallel with the longitudinal axis thereof, while the opposite face is formed oblique thereto, as at $11^d$, for permitting the pawl to slide over the ratchet teeth $6^d$. By the above arrangement, the pawl 11 may be reversed in arm $10^c$ to rotate ratchet wheel 6 in either direction, the teeth $6^d$ of said wheel being substantially straight sided as shown in Fig. 5.

Piston 5 is adapted to make a tight sliding fit within the cylinder 1. At the front side of piston 5 is an annular L-shaped packing $5^a$ contacting with the walls of the cylinder, and secured to the piston 5 by means of a ring $5^b$, bolted or screwed to the end of piston 5, the periphery of ring $5^b$ pressing the packing $5^a$ against the walls of the cylinder. A split piston ring $5^c$ housed in an annular recess $5^d$ in the periphery of ring $5^b$ causes the packing $5^a$ to contact tightly with the walls of the cylinder, said piston ring $5^c$ being expanded by means of springs $5^e$ housed in radially disposed bores $5^f$ (Fig. 7) in ring member $5^b$ and pressing against the inner face of the piston ring $5^c$.

Extending from the opposite side of piston 5 is an axially disposed tubular extension $5^g$ adapted to telescope the inner end of piston rod 4. A transverse pin $4^b$ adjacent the end of rod 4, engaging an elongated slot $5^h$ in the extension $5^g$, limit such telescoping movement and moreover rotatorial movement of piston 5 with respect to plate $4^c$. On piston rod 4, within the cylinder 1, and adjacent the end of extension $5^g$ is a fixed plate $4^c$, having diametrically disposed openings $4^d$ therein. A strong coil spring 12 interposed between piston 5 and plate $4^c$ normally tends to separate said members, as shown in Figs. 3 and 8.

Latch means are provided for locking piston 5 to plate $4^c$ when spring 12 has been compressed its maximum extent, said means comprising diametrically disposed levers $5^k$ lying close to the extension $5^g$ within the spring 12, said levers $5^k$ being pivoted on lugs $5^m$ adjacent the piston 5, the outer ends of said levers being hooked as at $5^n$, and being disposed in line with the openings $4^d$ of plate $4^c$. Springs $5^p$ normally urge the hooked ends of levers $5^k$ towards the axis of rod 4, pins $5^r$ on levers $5^k$ adjacent their outer ends engaging slotted guides $5^s$ on the end of extension $5^g$ serving to guide the ends of lever $5^k$ and to limit the pivoting movements thereof. When plate $4^c$ has been advanced toward piston 5, by rotating ratchet wheel 6, until spring 12 is fully compressed the ends of latch levers $5^k$ will enter the openings $4^d$ in plate $4^c$, as shown in Fig. 4, and lock same together, until released as hereinafter explained.

The means for releasing the latch levers $5^k$ to unlock piston 5 from plate $4^c$, comprises a collar $4^e$ slidably mounted on the rod 4 adjacent the plate $4^c$ and the outer hooked end $5^n$ of latch levers $5^k$. A pin $4^f$, having an enlarged central portion $4^g$, passes diametrically through collar $4^e$ and slides in diametrically opposite slots $4^h$ in piston rod 4. Piston rod 4 is provided with an axial bore $4^k$ housing a screw shaft $4^m$ which passes through a tapped bore in the enlarged central portion $4^g$ of pin $4^f$ whereby as shaft $4^m$ is rotated collar $4^e$ will be moved axially of rod 4. Shaft $4^m$ extends through the outer end of piston rod 4 and is provided with a hand wheel 13 for rotating the shaft. Suitable means $4^n$ may be provided for preventing longitudinal or axial movement of shaft $4^m$ within rod 4 while permitting rotatorial motion therein.

As shown in Fig. 4, when the latch levers $5^k$ are engaged with the openings $4^d$ of plate $4^c$ to lock piston 5 to said plate, in order to release the latch levers hand wheel 13 should be rotated to advance collar $4^e$ towards the hooked ends $5^n$ of levers $5^k$, and the collar $4^e$ acting as a cam will force the outer ends of levers $5^k$ apart permitting same to slip through openings $4^d$. Collar $4^e$ should then be retracted to permit the latch levers to relock when spring 12 has again been sufficiently compressed.

Means are also provided for indicating the amount of lubricant used on each particular job, said means comprising a graduated tape 14 adapted to wind upon a self-winding roller $14^a$ mounted in a housing $3^d$ extending from the top of head 3, said housing being open at the top, or having a transparent plate at the top. Tape 14 may unwind from roller $14^a$ and is passed over idler rollers $14^b$ and $14^c$ at the top of said housing $3^d$ whereby the graduations on the tape will be visible from the top of the housing, tape 14 further running over an idler roller $14^d$ in housing $3^d$ opposite one of the openings $4^d$ in plate $4^c$. The outer end of tape 14 is passed through said opening $4^d$ and is attached to the end $5^n$ of the respective latch lever $5^k$, whereby the tape will be shifted by and with the movement of the piston 5. The top of casing $3^d$ may be provided with an index mark as shown in Fig. 6, and by subtracting the readings of the tape before and after greasing the amount of lubricant used on any particular "job" may be readily ascertained.

For convenience in moving the grease gun around, I preferably mount the cylinder 1 horizontally on a truck of any suitable kind, the truck shown in the drawing comprising a wheeled rear axle 15 surrounding the rear end of the grease gun by means of upright bars 16 bolted to the axle 15 and to the under side of the arms $8^b$. The front end of the cylinder 1 is supported on an upright 17 formed by bending a metal strap around the cylinder 1, the ends of the strap depending from the central portion of the under side of the cylinder and being pivotally connected at their lower ends to the center of a front wheeled axle 18, having a usual tongue 19. Preferably the rear axle 15 is braced by means of diagonally disposed bars 20 extending from the lower ends of uprights 16 to the upper end of upright 17 immediately below the cylinder 1, as shown in Fig. 1.

In operation, when valve $2^b$ is open lubricant may be withdrawn from pipe $2^d$, and as the pressure of the lubricant in the cylinder 1 falls, by turning ratchet wheel 6 a few notches manipulating handle $10^b$, the piston rod 4 and piston 5 will be advanced in the cylinder 1 to build up the pressure of the lubricant to the desired amount, spring 12 compressing or yielding according to the pressure of the lubricant resisting the advance of the piston. When piston 5 has been advanced to meet the outlet head 2 and can advance no further, further rotation of ratchet wheel 6 will advance plate $4^c$ towards the piston 5 further compressing spring 12 until latch levers $5^k$ lock in openings $4^d$ of plate $4^c$. Ratchet wheel 6 should then be rotated in the opposite direction, by reversing the pawl 11 in its socket $10^d$, (as hereinbefore explained) to retract the piston 5 and plate $4^c$, while locked together, to the opposite end of cylinder 1, or into position shown in Fig. 4. Plug $2^a$ may then be removed, and the cylinder filled with lubricant, and plug $2^a$ replaced, and valve $2^b$ closed.

In order to give the lubricant in the cylinder an initial pressure, hand wheel 13 should be rotated, advancing collar $4^e$ to release the latch levers $5^k$, whereupon the spring 12 will move piston 5 outwardly building up pressure in the cylinder without manipulating ratchet wheel 6 or piston rod 4. The reading of the tape 14 opposite the index mark on casing $3^d$ when piston 5 has come to rest will then be the zero reading for such filling.

I do not limit my invention to the exact form shown in the drawings, for obviously changes may be made therein within the scope of the claims.

I claim:

1. In combination, a cylinder; a piston rod; a member on said rod within the cylinder; a piston in said cylinder; resilient means interposed between said piston and member; and latch means for automatically locking the piston to said member when the resilient means is compressed.

2. In a combination as set forth in claim 1, said latch means comprising a latch lever pivoted on said piston, the outer end of said lever being adapted to engage said member; and means for yieldingly urging the outer end of said lever toward the axis of said cylinder.

3. In combination a cylinder; a piston rod; a member on said rod within the cylinder; a piston in said cylinder; resilient means interposed between said piston and member; latch means for automatically locking the piston to said member when the resilient means has been compressed; and means for releasing said latch means.

4. In a combination as set forth in claim 3, said member having an opening therein; and said latch means comprising a latch lever pivoted on said piston, the outer end of said lever being disposed in alignment with said opening; and means for yieldingly drawing the outer end of said lever toward the axis of said cylinder.

5. In a grease gun, a cylinder; a piston rod; means for advancing said piston rod; a member on said rod within the cylinder; a piston in said cylinder; resilient means interposed between said piston and member; latch means for automatically locking the piston to said member when the resilient means has been compressed its maximum extent; and means for releasing said latch means.

6. In a grease gun as set forth in claim 5, said piston rod being threaded; means for preventing rotation of said rod while permitting axial movement thereof; and said means for advancing the piston rod comprising a ratchet wheel having a tapped bore mounted on said rod; a lever pivoted on said gun; an arm pivoted on said lever, and overlying the ratchet wheel, said arm having a non-circular recess therein; and a reversible pawl mounted in said recess and engaging the ratchet wheel.

7. In a grease gun as set forth in claim 5, said member having an opening therein; and said latch means comprising a latch lever pivoted on said piston, the hooked end of said lever being disposed in alignment with said opening; and means for yieldingly drawing the outer end of said lever towards the axis of said cylinder.

8. In combination with a grease gun as set forth in claim 5, means for registering the amount of grease discharged from said gun, comprising a housing having an opening and an index mark at said opening; a self-winding roller mounted in said housing; and a graduated tape wound on said roller; the outer end of said tape being connected to said piston; and a portion of the tape being visible through the opening.

9. In combination with a grease gun as set forth in claim 5, a ring member bolted to the front side of said piston; an L-shaped annular packing interposed between the ring and piston, said ring having an annular peripheral groove; a piston ring in said groove; a plurality of radially disposed bores in said ring member communicating with said groove; and springs in said bores adapted to expand the piston ring.

10. In a grease gun, a cylinder; a piston rod; a member on said rod within the cylinder; a piston in said cylinder; resilient means interposed between said piston and member; a latch lever pivoted on said piston the outer end of said lever being adapted to engage said member; means for yieldingly drawing the outer end of said lever towards the axis of said cylinder, whereby when the resilient means is compressed the piston will be locked to said member; and means for releasing said locking means.

11. In a grease gun as set forth in claim 10, said releasing means comprising a collar slidably engaging said piston rod adjacent the end of said lever; and means for advancing the collar on said shaft.

12. In combination with a grease gun as set forth in claim 10, means for registering the amount of grease discharged from said gun, comprising a housing having an opening and an index mark at said opening; a self-winding roller mounted in said housing; and a graduated tape wound on said roller, the free end of said tape being connected to said piston; and a portion of the tape being visible through the opening.

13. In combination with a grease gun as set forth in claim 10, a ring member bolted to the front side of said piston; an L-shaped annular packing interposed between the ring and piston; said ring having an annular peripheral groove; a piston ring in said groove; a plurality of radially disposed bores in said ring member communicating with said annular groove; and springs in said bores adapted to expand the piston ring.

14. In a grease gun, a cylinder, a piston rod, a member on said rod within the cylinder; said member having an opening therein; a piston in said cylinder; resilient means interposed between said piston and member; a latch lever pivoted on said piston; the outer end of said lever being disposed in alignment with said opening; means for yieldingly drawing the outer end of said lever towards the axis of said cylinder; whereby when the resilient means have been compressed the piston will be locked to said member; a collar slidably engaging said piston rod adjacent the end of said lever; and means for advancing the collar on said rod.

15. In a grease gun as set forth in claim 14, said piston rod being tubular; and having diametrically disposed slots therein in way of said collar; and said means for moving the collar comprising a pin having an enlarged central portion transfixing said collar and engaging said slots; the central portion of the pin having a tapped bore therein; a screw shaft housed in the bore of the piston rod and engaging the tapped bore of the pin; means for rotating said screw shaft.

16. In combination with a grease gun as set forth in claim 14, means for registering the amount of grease discharged from said gun, comprising a housing having an opening and an index mark at said opening; a self-winding roller mounted in said housing; and a graduated tape wound on said roller, the free end of said tape being connected to said piston; and a portion of the tape being visible through the opening.

17. In combination with a grease gun as set forth in claim 14, a ring member bolted to the front side of said piston; an L-shaped annular packing interposed between the ring and piston; said ring having an annular peripheral groove; a split piston ring in said groove; a plurality of radially disposed bores in said ring member communicating with said annular groove; and springs in said bores adapted to expand the piston ring.

18. In a grease gun, a cylinder; a piston rod; means for advancing said piston rod; a plate fixed on said rod within the cylinder and having a plurality of openings therein; a piston in said cylinder; resilient means interposed between said piston and plate; a plurality of latch levers pivoted on said piston, the outer ends of said levers being disposed in alignment with their respective openings; means for yieldingly urging the outer ends of said levers towards the axis of said cylinder, whereby when said levers enter said openings the piston and plate will be locked together; and means for releasing said locking means.

19. In a grease gun as set forth in claim 18, said piston rod being threaded; means for preventing rotation of said rod; and said means for advancing the piston rod comprising a ratchet wheel having a tapped bore mounted on said rod; a bearing on the end of said cylinder for said ratchet wheel; a second bearing for supporting the outer end of said rod; a ball thrust bearing interposed between said ratchet wheel and said second bearing; a lever pivoted opposite the ratchet wheel; and an arm pivoted on said lever and overlying the ratchet wheel, said arm having a non-circular bore in its outer end; and a reversible pawl mounted in said bore and engaging the ratchet wheel.

20. In a grease gun as set forth in claim 18, said releasing means comprising a collar slidably engaging said piston rod adjacent the ends of said latch levers; and means for advancing the collar on said shaft.

21. In combination with a grease gun as set forth in claim 18, means for registering the amount of grease discharge from said gun, comprising a housing having an opening, and an index mark at said opening, a self-winding roller mounted in said housing; and a graduated tape wound on said roller and passing over suitably disposed rollers opposite said opening, the free end of said tape being connected to said piston; and a portion of the tape being visible through the opening.

22. In combination with a grease gun as set forth in claim 18, a ring member bolted to the front side of said piston; an L-shaped annular packing interposed between the ring and piston and having its peripheral portion lying intermediate the cylinder and ring; said ring having an annular peripheral groove; a split piston ring in said groove; a plurality of radially disposed bores in said ring member communicating with said annular groove; and springs in said bores adapted to expand the piston ring.

23. In a grease gun, a cylinder, a piston rod, means for advancing said piston rod; a fixed plate on said rod within the cylinder and having a plurality of openings therein; a piston in said cylinder; resilient means interposed between said piston and plate; a plurality of latch levers pivoted on said piston, the outer hooked ends of said levers being disposed in alignment with their respective openings; means for yieldingly drawing the outer ends of said levers towards the axis of said cylinder, whereby when said levers enter said openings the piston and plate will be locked together; a collar slidably mounted on said piston rod adjacent the outer ends of said levers; and means for advancing the collar on the shaft to release the latch levers.

24. In a grease gun as set forth in claim 23, said piston rod being tubular; and having diametrically disposed slots therein in way of said collar; and said means for moving the collar comprising a pin having an enlarged central portion transfixing said collar and engaging said slots; said central portion of the pin having a tapped bore therein; a screw shaft housed in the bore of the piston rod, and engaging the tapped bore; and a hand wheel on the outer end of said screw shaft for rotating same.

25. In a grease gun as set forth in claim 23, said piston rod being threaded, means for preventing rotation of said rod; and said means for advancing the piston rod comprising a ratchet wheel having a tapped bore mounted on said rod; a bearing on the end of said cylinder for said ratchet wheel; a second bearing for supporting the outer end of said rod; a ball thrust bearing interposed between said ratchet wheel and said second bearing; a lever pivoted opposite the ratchet wheel; and an arm pivoted on said lever and overlying the ratchet wheel, said arm having a non-circular bore in its outer end; and a reversible pawl mounted in said bore and engaging the ratchet wheel.

26. In combination with a grease gun as set forth in claim 23, means for registering the amount of grease discharged from said gun, comprising a housing having an opening and an index mark at said opening, a self-winding roller mounted in said housing; and a graduated tape wound on said roller and passing over suitably disposed rollers opposite said opening, the free end of said tape being connected to said piston; and a portion of the tape being visible through the opening.

27. In combination with a grease gun as set forth in claim 23, a ring member bolted to the front side of said piston; an L-shaped annular packing interposed between the ring and piston and having its peripheral portion lying intermediate the cylinder and ring; said ring having an annular peripheral groove; a split piston ring in said groove; a plurality of radially disposed bores in said ring member communicating with said annular groove; and springs in said bores adapted to expand the piston ring.

28. In a grease gun, a cylinder, a piston rod, means for advancing said piston rod;

a plate fixed on said rod within the cylinder; a piston in said cylinder; resilient means interposed between said piston and plate; a tubular extension on said piston having a telescopic engagement with the inner end of said piston rod; means for limiting said telescopic movement; said plate having diametrically disposed openings therein; diametrically disposed latch levers pivoted on said extension, the hooked ends of said levers being disposed in alignment with their respective openings in said plate; means for yieldingly drawing the outer ends of said levers towards the axis of said cylinder, whereby when said levers enter said openings the piston will be locked to said plate; a collar slidably engaging said piston rod adjacent the ends of said latch levers, and means for moving said collar to release the latch levers.

29. In a grease gun as set forth in claim 28, said piston rod being tubular; and having diametrically disposed slots therein in way of said collar; and said means for moving the collar comprising a pin having an enlarged central portion passing diametrically through said collar and engaging said slots, said central portion of the pin having a tapped bore therein; a screw shaft housed in the bore of the piston rod and engaging the tapped bore of said pin; and a hand wheel on the outer end of said shaft for rotating said shaft.

30. In a grease gun as set forth in claim 28, said piston rod being threaded, means for preventing rotation of said rod; and said means for advancing the piston rod comprising a ratchet wheel having a tapped bore mounted on said rod; a bearing on the end of said cylinder for said ratchet wheel; a second bearing for supporting the outer end of said rod; a ball thrust bearing interposed between said ratchet wheel and said second bearing; a lever pivoted on said lever and overlying the ratchet wheel, said arm having a non-circular bore in its outer end; and a reversible pawl mounted in said bore and engaging the ratchet wheel.

31. In combination with a grease gun as set forth in claim 28, means for registering the amount of grease discharged from said gun, comprising a housing having an opening and an index mark at said opening; a self-winding roller mounted in said housing; and a graduated tape wound on said roller and passing over suitably disposed rollers opposite said opening, the free end of said tape being connected to said piston; and a portion of the tape being visible through said opening.

32. In combination with a grease gun as set forth in claim 28, a ring member bolted to the front side of said piston; an L-shaped annular packing interposed between the ring and piston and having its peripheral portion lying intermediate the cylinder and ring; said ring having an annular peripheral groove; a split piston ring in said groove; a plurality of radially disposed bores in said ring member communicating with said annular groove; and springs in said bores adapted to expand the piston ring.

In testimony that I claim the foregoing as my own I affix my signature.

HARRY T. TAYLOR.